United States Patent

[11] 3,624,055

[72] Inventors Riad H. Gobran
Levittown;
Stephen W. Osborn, Yardley, both of Pa.
[21] Appl. No. 368,382
[22] Filed May 18, 1964
[45] Patented Nov. 30, 1971
[73] Assignee Thiokol Chemical Corporation
Bristol, Pa.
Continuation-in-part of application Ser. No. 165,034, Jan. 8, 1962, and a continuation-in-part of 267,799, Mar. 25, 1963, now abandoned. This application May 18, 1964, Ser. No. 368,382
The portion of the term of the patent subsequent to Jan. 23, 1985, has been disclaimed.

[54] CURABLE COPOLYMERS OF EPISULFIDE MONOMERS
13 Claims, No Drawings
[52] U.S. Cl. ................................................. 260/79.7, 260/23, 260/33.6, 260/41, 260/79.5
[51] Int. Cl. ........................................................ C08f 25/00, C08g 23/00, C08g 25/00
[50] Field of Search ............................................. 260/79, 79.7

[56] References Cited
UNITED STATES PATENTS
2,183,860 12/1939 Coltof ........................ 260/79

| 2,185,660 | 1/1940 | Coltof et al. ................. | 260/79 |
| 2,949,474 | 8/1960 | Murdock et al. ............. | 260/327 |
| 3,222,324 | 12/1965 | Brodoway ..................... | 260/79 |
| 3,222,325 | 12/1965 | Brodoway ..................... | 260/79.7 |
| 3,222,326 | 12/1965 | Brodoway ..................... | 260/79 |

*Primary Examiner*—James A. Seidleck
*Attorney*—Curtis, Morris & Safford

ABSTRACT: Copolymers essentially composed of a major portion of monomeric units derived from one or more monomers which are free from ethylenic unsaturation, have at least three carbon atoms and have a polymerizable thiiranyl group; and a minor portion of monomeric units derived from one or more monomers having both a polymerizable thiiranyl group and a polymerizable ethylenically unsaturated group are disclosed. The monomers free from ethylenic unsaturation may be, for example, ethylene sulfide, propylene sulfide, the 1,2- and 2,3-butylene sulfides, vinyl cyclohexane sulfide, 2-benzyl thiirane, paramethyl styrene episulfide, styrene sulfide, cyclohexene episulfide, and isobutylene sulfide. The ethylenically unsaturated monomers may be, for example, allylthioglycidyl ether, thioglycidyl acrylates, thioglycidyl alkacrylates such as thioglycidyl methacrylate, vinyl cyclohexene episulfide, and butadiene monoepisulfide. The monomers are polymerized through the thiiranyl groups thereof. The copolymers can be cured through the ethylenically unsaturated groups thereof to produce elastomers having good physical properties and solvent resistance.

CURABLE COPOLYMERS OF EPISULFIDE MONOMERS

The present application is a continuation-in-part of applications of Riad H. Gobran and Stephen W. Osborne, Ser. No. 165,034 filed Jan. 8, 1962, still pending, and Ser. No. 267,799 filed Mar. 25, 1963 now abandoned, entitled "Propylene Sulfide Polymers and Method of Making the Same" and "Butylene Sulfide Polymers and Method of Making the Same" respectively.

The present invention relates to copolymers of episulfide compounds. More particularly, this invention relates to curable copolymers of episulfide compounds that are nontacky elastomers of relatively high molecular weight and the cured products thereof. The copolymers can be vulcanized to produce vulcanizates having good physical properties and solvent resistance; hence they can be used for many of the applications for which vulcanized rubbers are used.

The term copolymer is used herein in its broad sense to include polymers formed from more than two monomers, e.g. terpolymers, as well as polymers formed from only two monomers.

While previous attempts have been made by those skilled in the art to produce high molecular weight episulfide polymers, these prior efforts, so far as we are aware, have been unsuccessful since the polymers produced have been of relatively low molecular weight and have lacked the desired solvent resistance. It is accordingly an object of the present invention to provide episulfide copolymers having molecular weights substantially higher than those of the episulfide polymers previously produced. It is another object of the invention to provide elastomeric episulfide polymers which have good high temperature molding properties and which are vulcanizable to produce vulcanizates having good physical properties. Another object of the invention is to provide liquid episulfide copolymers that are curable. It is still another object of the invention to provide vulcanized episulfide copolymer products having excellent physical properties and chemical resistance. Other objects of the invention will be in part obvious and in part pointed out hereinafter.

The copolymers of the present invention have properties which allow them to meet the requirements of the aforementioned objects and thus the instant copolymers have important utility in the fabrication of plastic articles having excellent mechanical properties and chemical resistance.

The copolymers of the present invention are prepared from one or more monomers which are free from ethylenic unsaturation and have a polymerizable thiiranyl group and one or more monomers having both a polymerizable thiiranyl group and a polymerizable ethylenically unsaturated group. At least one carbon of the thiiranyl group of the monomer free from ethylenic unsaturation should desirably have substituents of rather low molecular weight, for example hydrogen or lower alkyl groups such as ethyl; this permits polymerization without an excessive degree of steric hindrance reducing the yield of polymer.

Alkylene sulfides are advantageous as the monomers free from ethylenic unsaturation, especially those lower alkylene sulfides having two to 10 carbon atoms. Among such monomers are ethylene sulfide, propylene sulfide, the 1,2- and 2,3-butylene sulfides, vinyl cyclohexane sulfide, 2-benzyl thiirane, paramethyl styrene episulfide, styrene sulfide, cyclohexene episulfide, and isobutylene sulfide.

Among ethylenically unsaturated monomers useful in the process of the present invention are such compounds as allylthioglycidyl ether, thioglycidyl acrylates, thioglycidyl alkacrylates such as thioglycidyl methacrylate, vinyl cyclohexene episulfide, and butadiene monoepisulfide.

The initial polymerization products of the invention are curable, essentially linear copolymers consisting essentially of monomeric units of the formulas

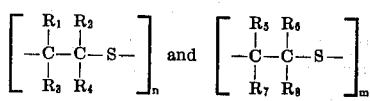

where $R_1$, $R_2$, $R_3$ and $R_4$ are hydrogen, alkylene, alkyl, aralkyl, alkaryl, cycloalkyl, or aryl, but wherein only one of $R_1$, $R_2$, $R_3$ and $R_4$ has more than two carbon atoms. $R_1$ and $R_2$ may form a single alkylene bridge between the carbon atoms. $R_5$, $R_6$, $R_7$ and $R_8$ are defined similarly to the definition of $R_1$, $R_2$, $R_3$ and $R_4$ excepting that at least one member of the group consisting of $R_5$, $R_6$, $R_7$ and $R_8$ comprises a polymerizable ethylenically unsaturated group. The ratio of $n$ to $m$ is advantageously at least 1:1.

During polymerization by the process of the present invention, the episulfide rings of the monomers open up and the monomers polymerize through the opened rings to form vulcanizable copolymers. The ethylenically unsaturated polymerizable groups on these compounds do not ordinarily take part in the copolymerization and therefore remain available for subsequent cross-linking reactions carried out in the presence of vinyl polymerization catalysts and sulfur. Advantageously, the unsaturated monomers will provide 1 to 50 percent of the monomeric units in the copolymer. The preferable amount of such monomeric units is 3 to 5 percent.

Copolymers comprising major portions of monomeric units of propylene sulfide and butylene sulfide are preferred because copolymers containing units of these monomers have advantageous elastomeric properties. However, all these monomers can be suitably used to form systems having desirable physical properties.

An advantageous catalyst useful in preparing vulcanizable episulfide copolymers is a reaction product of diethyl zinc and either water or hydrogen sulfide. The diethyl zinc-water catalyst may be prepared by reacting the diethyl zinc and water in an inert hydrocarbon solvent, for example, benzene or hexane, at a temperature of 0° to 100° C., preferably 20° to 50° C. The molar ratio of diethyl zinc to water may vary from about 1:1 to 3:1 and is preferably approximately 1:1.

To insure optimum activity of the diethyl zinc-type catalysts and to assure attainment of the highest molecular weights, the catalyst should be freshly prepared and used as soon as possible after its preparation. In some cases it will be found desirable to prepare the diethyl zinc catalysts in the polymerization reaction vessel just prior to or coincient with the initiation of the polymerization reaction. If it is necessary to store the catalyst for an appreciable period of time before its use, say for 48 hours or more, the activity of the catalyst can best be maintained by storage at a reduced temperature.

In polymerizing episulfide monomers, 0.05 to 3 percent of this catalyst based on the total monomer weight is advantageously used. About 1 to 2 percent is preferred.

It has been found important that the preparation of the aforementioned catalyst and also the polymerization reaction be carried out in an environment substantially free from elemental oxygen. Thus catalyst preparation and polymerization are desirably carried in an atmosphere of inert gas such as nitrogen, helium, or argon containing less than about 20 parts per million of oxygen. Commercially available grades of diethyl zinc have been found suitable for use in the present invention. The water with which the diethyl zinc is reacted should be distilled water, preferably deoxygenated by boiling in air and cooling under a pure nitrogen atmosphere. The hydrocarbon solvent used in the preparation of the catalyst should desirably be either dried over sodium or freshly distilled.

The diethyl zinc-hydrogen sulfide catalyst can be prepared in the same general manner as indicated above for the diethyl zinc-water catalyst. The molar ratio of $H_2S$ to diethyl zinc employed in making the catalyst may vary from about 0.5:1 to 1.2:1 with the preferred ratio being about 1:1. The diethyl zinc may be dissolved in the solvent and $H_2S$ gas bubbled through the solution or alternatively, a standard, saturated solution of $H_2S$ in hydrocarbon solvent can be mixed in predetermined proportions with a standard solution of diethyl zinc in a hydrocarbon solvent. The diethyl zinc-$H_2S$ catalyst, like the diethyl zinc-water catalyst, should be freshly prepared in a substantially oxygen-free and anhydrous environment. In polymerizing episulfide monomers, 0.05 to 3 percent of this diethyl zinc-H₂S catalyt, based on the total weight of the monomers, is advantageously used. About 0.5 percent of the catalyst is preferred.

Other catalysts which may be used to prepare the vulcanizable episulfide polymers of this invention include such catalysts adapted to promote polymerization through the episulfide groups as disclosed in copending applications, U.S. Ser. Nos. 269,722 filed Apr. 1, 1963 by Osborne, 269,774 filed Apr. 1, 1963 by Osborne et al., 255,675 filed Feb. 1, 1963 by Kutch et al., and 213,015 filed July 27, 1962 by Osborne.

Osborne in U.S. Ser. No. 269,722 discloses various oxide compounds as useful catalysts. These include $Na_2O$, $Na_2O_2$, $MgO$, $Al_2O_3$, $K_2O$, $K_2O_2$, $CaO$, $CaO_2$, $Fe_2O_3$, $CoO$, $NiO$, $SrO$, $SrO_2$, $SnO$, $SnO_2$, $Sb_2O_3$, $BaO$, $BaO_2$, $PbO$, $PbO_2$, and $B_2O_3$. Catalysts having a metal ion with a valence of 2 such as CaO are preferred. The activity of catalysts is increased with decreasing particle size, i.e. with increase in total catatlyst surface; for best results, particle sizes of less than 1 micron are preferred. In polymerizing episulfide monomers, about 0.01 to 10 percent of these oxide catalysts are advantageously used based on the total weight of the monomer. About 0.5 to 5 percent is preferred.

Osborne et al. in U.S. Ser. No. 269,774 disclose zinc and mercury salts such as the peroxides, sulfides, chromates, adipates, oxalates, oxides, hydroxides, and carbonates to be effective catalysts for episulfide polymerization. The preferred particle size is again less than 1 micron.

Kutch et al. in U.S. Ser. No. 255,675 disclose cadmium salts such as the hydroxides, sulfides, silicates, oxides, acetates, sulfates, and carbonates to be useful in the polymerization of episulfide monomers. In polymerizing episulfide monomers with these cadmium salts, about .01 to 10 percent of catalyst is advantageously used. About 0.1 to 5 percent is preferred.

Osborne in U.S. Ser. No. 213,015 discloses metallic carbonate catalysts such as the zinc, manganese, cadmium lead, cobalt, and nickel carbonates, which are advantageously used in polymerizing episufide monomers in the amounts of 1 to 5 percent based on the weight of the monomers.

In general, any of the catalysts disclosed in the indicated copending applications may be used for polymerizing these episulfide monomers except that the dialkyl zinc catalysts are not easily adapted for use with systems including the acrylate-type monomers; the hydroxide catalysts are preferable for such systems. Quantities of catalysts from about 0.01 to 10 percent based on the total weight of monomers of these catalysts are normally useful, with the lower limit practical for the diethyl zinc compositions and zinc and mercury salts about 0.05 percent. The preferred catalyst range is 0.5 to 5 percent.

Copolymers of different physical properties may be obtained by appropriate selection of catalyst, for example, a liquid polymer comprising butylene sulfide and allylthioglycidyl ether is obtained by using MgO but a solid elastomer is obtained when a dialkyl zinc catalyst system is used.

Details of the polymerization promoted with the various catalysts are given in the specific examples set forth below. In general, the polymerization process is executed by bringing the monomeric episulfide and unsaturated monomer into contact with the catalysts described above. The polymerization can be carried out conveniently at temperatures of 20° to 100° C. in 2 to 25 hours and is preferaby conducted at 25° to 50° C. for 15 to 20 hours.

The polymerization reaction may be conducted without using a solvent, or various inert organic solvents can be used as a reaction medium. Aromatic hydrocarbons, e.g. benzene, toluene, or xylene; aliphatic hydrocarbons, e.g. isopentane, n-hexane, or octane; or chlorinated hydrocarbons, e.g. carbon tetrachloride, methylene chloride, or ethylene chloride are typical of the solvents useful as reaction media. The reaction mixture may be agitated to facilitate the reaction. The pressure at which the reaction is carried out does not appear to be particularly critical. Thus the reaction may be conducted at atmospheric pressure or in a closed vessel under autogenous pressure. In either case the reaction mixture should be kept oxygen-free by the use of an atmosphere of purified inert gas. The reaction system should be anhydrous except, of course, in those instances when a small amount of water is required to form diethyl zinc-water catalyst as described above. However, some catalysts, for example the carbonates and cadmium salts, will still promote polymerization in an environment where some water is present.

The essentially linear episulfide copolymers of the invention may be cross-linked by reacting the unsaturated groups contained therein with suitable vinyl polymerization catalysts, for example the free radical peroxide catalysts known to the art. Furthermore such conventional vulcanizing agents as sulfur are suitable for obtaining cures which, like those obtained by use of vinyl polymerization catalysts, yield three-dimensional cross-linked polymer networks which are highly resistant to solvent attack.

In order to point out more fully the nature of the present invention, the following specific examples are given as illustrative methods of making the present products. In all of the examples utilizing diethyl zinc-type catalyst, the polymerization and catalyst solvents were neither predried over sodium or freshly distilled. The water used for these examples was distilled water from which free oxygen had been removed by boiling for 10 minutes in air followed by cooling under a nitrogen atmosphere. Where solid product polymer contained physically bound solvent, the solvent was removed by evaporation, first at room temperature and then in a vacuum oven at elevated temperature.

The mechanical properties reported in these examples were obtained by methods for the testing of plastic materials conventionally used by those skilled in the art. Except where stated otherwise, the data were obtained at a temperature of 75° F. The tensile strength is reported in pounds per square inch as is the modulus at various strain values of 100, 200 and 300 percent of the original test specimen length. Elongation is reported as a percentage of the original test specimen. Tensile, modulus, and elongation were measured according to ASTM Test D 638-58I. Hardness is reported in terms of a Shore A durometer value as defined in ASTM Test D 676-59T. Compression set is reported in per cent of original deflection as set forth in ASTM Test D 395-55, after maintaining the sample at 158° F. for 22 hours. Samples tempered at 212° F. for 24 hours before testing have also been tested for compression set where indicated. The tear strength, reported in pounds, was obtained using Die C according to ASTM Test D 624-54.

EXAMPLE 1

A clean 30-ounce bottle was flushed with nitrogen and 300 ml. of benzene was distilled from sodium directly into the bottle. To the bottle was added 25 ml. of a saturated solution of H₂S in benzene (0.016 mols of H₂S in 25 ml. of benzene at 20° C.), and 300 ml. of twice-distilled propylene sulfide was fractionally distilled into the bottle from calcium hydride using a 300 ml. Widmer Column. Then 25.1 ml. (5mol percent) of freshly distilled allylthioglycidyl ether (B.P. 85°-86°C./25 mm.) was added to the bottle by means of pipette, and finally 0.016 mols of diethyl zinc in a Standard Solution in benzene was added by mean of a calibrated syringe. The mixture, which became cloudy immediately, was capped with aluminum foil and swirled to effect a complete mixing of the mixture. After an induction period of 5 to 10 minutes, the mixture became noticeably more viscous, and after 20 to 25 minutes the temperature reached 35°–40° C., as the polymerization proceeded exothermically.

After the temperature reached 40° C., the mixture gelled within 5 minutes and the polymerization proceeded to completion at the boiling point of the solvent (75°–80° C.) as indicated by visible bubbling of the mixture, and the presence of vapors at 75°–80° C. over the polymer mass. The heat of reaction required 15 to 30 minutes to evolve, and the mixture was allowed to cool and stand at room temperature for 24 hours. The bottles were cracked open to remove the polymer and the benzene was evaporated in vacuum at 1 mm. Hg.

The combined yield from 10 runs using the procedure of this example was 2,450 grams (84.6 percent) of tack free, soft, white material.

A solubility test was conducted by attempting to dissolve 1 gram of the polymer in 100 ml. of benzene by shaking the solvent and polymer together at room temperature ($25°–30°$ C.). After 72 hours the polymer was found to be soluble at this 1 percent concentration. The intrinsic viscosity measured in chloroform at 30° C. was 2.68. The product was subjected to infrared analysis to determine the mol percent of allylthioglycidyl ether units in the interpolymer. The infrared absorbence exhibited by the same at 1,640 $cm^{-1}$ was compared with a standard curve prepared by mixing known amounts of allythioglycidyl ether with homopolymeric propylene sulfide in methylene chloride. This analysis disclosed that the interpolymer contained 3.74 mol percent of allylthioglycidyl ether units.

The interpolymer was cured for 30 minutes at 320° F. using the following cure formulation:

|  | Parts by Weight |
|---|---|
| Interpolymer containing 3.74 mol % Allylthioglycidyl ether | 100 |
| Stearic Acid | 1 |
| Philblack O (High Abrasion Furnace Black) | 50 |
| Zinc Oxide | 5 |
| Sulfur | 1.5 |
| Tellurac (Tellurium diethyldithiocarbamate | 1.5 |
| Benzothiazyl Disulfide | 1 |
| The cured material had the following properties when measured at 75° F.: | |
| Tensile | 650 |
| Elongation | 230 |
| Hardness | 71 |

EXAMPLE 2

Two bottles were each flushed with nitrogen and each was successively charged with 150 ml. of benzene, 3.0 ml. (0.0162 mol) of a 5.42 molar solution of diethyl zinc in benzene and 0.28 ml. (0.0155 mol) of oxygen-free water. The bottles were then capped and tumbled in a 60° C. bath for 2 hours. The bottles were cooled to room temperature, opened under a nitrogen atmosphere and each was charged with 100 ml. (94.6 grams or 1.28 mol) of propylene sulfide and 8.31 ml. (8.31 grams or 0.064 mol) of allylthioglycidyl ether. The bottles were again flushed with nitrogen, capped and allowed to stand overnight in a water bath at 25°–30° C. In the morning both bottles contained solid polymerization products.

One of the two bottles was allowed to stand for a further period of 72 hours at room temperature, after which the product was removed from the bottle and dried in air for one week to yield 95.8 grams (93.4 percent of theory) of a nontacky snappy white elastomer having an intrinsic viscosity (n) of 3.0 in methylene chloride at 30° C. The other bottle was allowed to stand for 168 hours before its contents were air dried. The yield from the second bottle was 106 grams (103 percent of theory) of a product of similar physical properties having an intrinsic viscosity of 2.70. Both products were insoluble in benzene.

A mixture of these copolymers was cured for 40 minutes at 307° F. using the following cure formulation in parts by weight:

| Copolymer | 100 |
|---|---|
| Philblack (HAF Carbon Black-filler) | 50 |
| Zinc Oxide | 5 |
| Stearic Oxide | 3 |
| Sulfur | 2 |
| Methyl Tuads (tetramethylthiuran disulfide) | |
| Tellurac (Tellurium diethylthiocarbonate) | 1 |
|  | 0.5 |

The cured elastomer had a modulus of 338; tensile strength–348; elongation–220; Shore A hardness–68.

EXAMPLE 3

A catalyst solution was prepared by mixing distilled water and diethyl zinc in a 0.75:1 ratio with benzene that had been refluxed and distilled over sodium and stored over a synthetic zeolite, namely a sodium alumina silicate such as that sold by the Linde Company Division of Union Carbide Corporation under the designation "Molecular Sieves, Type 4A." The solution was allowed to stand until a yellow color developed.

More benzene was dried over a sodium/lead alloy and filtered.

A clean 30-ounce soda bottle was dried at 100° C., cooled and successively charged with 400 ml. of the dry benzene, 75 grams of 1,2-butylene sulfide, 19.5 grams of allylthioglycidyl ether and 10 ml. of the catalyst solution. The catalyst added contained 1.2 millimoles of diethyl zinc and 0.9 millimoles of distilled water. The air-space in the bottle was purged with nitrogen after which the bottle was capped and tumbled in an 80° C. water bath for 4 hours. The bottle was then removed from the bath and its contents, while still hot, were added to 2,500 ml. of methanol. A polymeric product, a copolymer of 1,2-butylene sulfide and allylthioglycidyl ether, precipitated in the methanol, and was washed a second time with methanol before being cut up into small pieces for still another washing with methanol. The product was then dried overnight under vacuum at about 60° C. About 50 grams, about 52 percent of the yield theoretically possible, of a tack-free elastomer was obtained.

A quantity of 45 grams of copolymer was compounded on a rubber mill with 0.45 gram of stearic acid, 22.5 grams of a carbon black sold under the trade name Philblack O, 2.25 grams of ZnO, 0.68 gram of sulfur, and 0.90 gram of selenium diethyl-dithiocarbamate. The composition thus formed was cured at 300° F. for 40 minutes to give a product having the following properties:

| Modulus | |
|---|---|
| 100% | 300 |
| 200% | 690 |
| Tensile | 835 |
| Elongation | 230 |
| Hardness | 65 |

The modulus, tensile and elongation values are the average of the two highest results of three experiments.

EXAMPLE 4

To a reaction bomb there was charged 89.7 grams (1.02 moles) of 1,2-butylene sulfide, 23.4 grams (0.18 moles) of allylthioglycidyl ether, 400 ml. of benzene and 0.2 gram of magnesium oxide. The bomb was sealed and placed in an 80° C. water bath for 22 hours. The bomb was then allowed to cool to room temperature. The contents were filtered into a vacuum flask. The benzene and unused monomers were evaporated. The flask contained a small amount of an oily product which was a low molecular weight polymer of allylthioglycidyl ether and 1,2-butylene sulfide.

A small quantity of this polymer was cured with conventional vulcanizing agents to product a high molecular weight elastomer.

EXAMPLE 5

A clean, dry 30-ounce reaction bottle was charged with 73.8 grams (0.9975 mol) of propylene sulfide, 0.36 gram (0.0025 mol) of thioglycidylacrylate, 0.2 gram of cadmium hydroxide, and 400 ml. of benzene. The bottle was sealed and placed in a 50° C.±3° C. water bath for 60 hours, then removed from the bath, cooled, opened, nd the contents were poured into 1,000 ml. of petroleum ether to cause precipitation of a copolymer of propylene sulfide and thioglycidylacrylate. The precipitated interpolymer was then washed with two 500 ml. portions of petroleum ether and dried to a constant weight under vacuum at 50 C. The product yield was 61.5 grams, 83 percent of that theoretically possible.

EXAMPLE 6

A clean, dry 30-ounce reaction bottle was charged with 77.0 grams (0.985 mol) of propylene sulfide, 2.1 grams (0.015 mol) of thioglycidylacrylate, 0.2 gram of cadmium hydroxide, and 400 ml. of benzene. The bottle was sealed and placed in a 50° C.±3° C. water bath for 60 hours, then removed from the bath, cooled, opened, and the contents were poured into 1,000 ml. of petroleum ether to cause precipitation of a copolymer of propylene sulfide and thioglycidylacrylate. The precipitated interpolymer was then washed with two 500 ml. portions of petroleum ether and dried to a constant weight under vacuum at 50° C. The product yield was 63.0 grams, 83.8 percent of that theoretically possible.

A quantity of 50 grams of the copolymer was cured for 20 minutes at 310° F. with 5 grams of stearic acid, 25 grams of a high abrasion furnace black sold under the trade name Philblack "O," and 2 grams of a dicumyl peroxide sold under the trade name DiCup 40C. During milling the copolymer became tougher and upon completion of curing had the following physical properties:

| Modulus, p.s.i. | |
| --- | --- |
| 100% | 40 |
| 200% | 57 |
| Tensile, p.s.i. | 57 |
| Elongation, % | 200 |
| Hardness, Shore A | 14 |

Upon extraction in a Soxhlet extractor using chloroform for 19 hours and after drying under vacuum at 50° C., the copolymer exhibited a weight retention of 57.4 percent. The UNCURED COPOLYMER WAS SOLUBLE IN CHLOROFORM.

EXAMPLE 7

Two sealable, 30-ounce polymerization bottles were each cleaned, dried and charged with 94.5 grams of propylene sulfide, 7.0 grams of thioglycidyl methacrylate prepared by reacting glycidyl methacrylate and potassium thiocyanate in acetone, removing the solid byproducts and recovering the desired monomer by distilling off the acetone, 400 ml. of benzene, and 0.2 gram of cadmium hydroxide. The bottles were then capped and placed in a water bath at 49°±3° C. for about 65 hours during which time a copolymer of thioglycidyl methacrylate and propylene sulfide formed in the bottles. After removal from the bath, the reaction mix was poured into 1,400 ml. of methanol causing the precipitation of the copolymer. The copolymer was washed with water, then, after the particle size was reduced by mechanical means, dried for 19 hours at room temperature and 2 additional hours at 40° C. The two samples yielded 91.9 grams and 89.0 grams of polymer, representing 93.5 percent and 91, percent respectively, of the yields theoretically possible.

EXAMPLE 8

A 30-ounce polymerization bottle was cleaned, dried and charged with 0.4 gram of $Zn(OH)_2$, 150 ml. of distilled water, 79.2 grams of 1,2 butylene sulfide, and 14.4 grams of thioglycidyl acrylate. The bottle was sealed and placed in a water bath at 65° C. for 17 hours during which time a copolymer of butylene sulfide and thioglycidyl acrylate was formed. The bottle was then removed from the bath, cooled to room temperature, opened and the residual water was decanted off. The contents of the bottle were washed with about 200 ml. of methanol causing the polymer to precipitate. Thereupon the copolymer was dissolved in 200–300 ml. of benzene, reprecipitated in approximately 2,200 ml. of methanol, washed 3 times, with 200 ml. of methanol used for each washing, and finally dried for 20 hours under vacuum at approximately 50° C. A yield of 68 grams of copolymer was obtained; this was a yield of 72.5 percent of the yield theoretically possible.

Ten grams of the copolymer product were placed in a glass jar and dissolved in chloroform. Some heating was employed to assist in the solution of this copolymer. Ten drops of 2,5-dimethyl-,2,5-di(t-butylperoxy) hexane were added to the solution and the resultant mixture placed in a vacuum oven for approximately 3 hours at 50° C. to remove the chloroform solvent. The copolymer was then placed in an oven at 112°–135° C. for about 80 hours. At the end of this time the copolymer had cured to a hard elastomer which retained 87 percent of its weight when extracted with hot chloroform for 46 hours in a Soxhlet extraction tube.

EXAMPLE 9

A clean, dry 30-ounce glass reaction bottle was charged with 228 ml. of reagent grade benzene, 39 grams of allylthioglycidyl ether, 18 grams of ethylene sulfide and 0.2 grams of $Cd(OH)_2$. The bottle was capped and placed in an 80° C. rotating bath for 16 hours during which time a copolymer of ethylene sulfide and allylthioglycidyl ether was formed. At the end of this time the solids were filtered off, washed with methanol and dried under vacuum at 50° C. The resultant copolymer product was a solid having a melting point of 204°–214° C. The yield was 14.4 percent of that theoretically possible. This copolymer product was insoluble in chloroform.

A small quantity of the copolymer product was heated at 180° C. for 4 hours in the presence of 1.5 percent by weight of azobisisobutyronitrile during which time it cured to a hard plastic material which is resistant to chloroform solvent.

EXAMPLE 10

A reaction bomb, sparged with nitrogen and sealed, was charged with 16.3 grams (0.125 mol) of allylthioglycidyl ether, 74.0 grams (1.0 mol) of propylene sulfide, 7.5 grams (0.125 mol) of ethylene sulfide, 400 ml. of benzene and 10 ml. of diethylzinc solution prepared as described in example 3. The reaction proceeded for 4 hours at 80° C. after which the bomb was cooled and opened. Upon pouring the contents into 2,000 ml. portion of methanol, the polymer precipitated. The particle size of the polymer product was reduced and the product was washed twice with separate 1,000 ml. portions of methanol. The same yielded 90.5 grams, 92.5 percent of the amount theoretically possible.

A quantity of 150 grams of polymer prepared as set forth above was vulcanized for 20 minutes at 300° F. with 1.5 grams of stearic acid, 75.0 grams of a high abrasion furnace black sold under the trade name Philblack "O," 7.5 grams of zinc oxide, 3.0 grams of selenium diethyldithiocarbamate and 0.9 gram of sulfur.

The physical properties of the vulcanized polymer are as follows:

| Modulus | |
| --- | --- |
| 100% | 390 |
| 200% | 840 |
| 300% | 1,320 |
| Tensile | 1,550 |
| Elongation | 368 |
| Tear Strength | 240 |
| Hardness | 72 |

Samples of the cured interpolymer were placed in a series of solvents and after one week at room temperature were swollen as follows:

| Ethyl acetate | 87% |
| --- | --- |
| Toluene | 207% |
| Methyl ethyl ketone | 107% |
| Chloroform | 227% |
| Hexane | 10% |

EXAMPLE 11

A 30-ounce reaction bottle was cleaned, dried, sparged with nitrogen, and charged with 52.9 grams of propylene sulfide, 27.3 grams of ethylene sulfide, 16.9 grams of allylthioglycidyl ether, 400 ml. of benzene, and 10.0 grams of diethyl zinc solution prepared as indicated in example 3.

The bottle was again sparged with nitrogen, sealed and heated for 5 hours at 65° C. during which time a copolymer of propylene sulfide, ethylene sulfide, and allylthioglycidyl ether formed. The bottle was opened and its hot contents were poured into 2,000 ml. of methanol causing the copolymer to precipitate. Polymer particle size was reduced by cutting and the cut pieces were washed twice with 1,000 ml. portions of methanol. The copolymer was dried to a constant weight of 79.0 grams at 50° C. under vacuum; this weight represented 81.4 percent of that theoretically possible.

A quantity of 150 grams of the copolymer was cured for 20 minutes at 300° F. after being compounded on a rubber milling roll with 1.5 grams of stearic acid, 75.0 grams of a high abrasion furnace carbon black sold under the trade name Philblack "O", 7.5 grams of zinc oxide, 3.0 grams of selenium diethyldithiocarbamate, 0.9 gram of sulfur and 1.0 gram of octyldecylamine.

The physical properties of the cured terpolymer were as follows:

| Modulus | |
|---|---|
| 100% | 710 |
| 200% | 1370 |
| 300% | 1915 |
| Tensile | 2235 |
| Elongation | 390 |
| Hardness | 87 |
| Tear | 435 |
| Compression Set | 86 |
| Compression Set Tempered | 53 |

EXAMPLE 12

A 30-ounce polymerization bottle was cleaned, dried and charged with 71.5 grams of 1,2 butylene sulfide, 13.9 grams of ethylene sulfide, 15.1 grams of allylthioglycidyl ether, 400 ml. of benzene and 10 ml. of diethyl zinc solution as prepared in example 3. The bottle was sparged with nitrogen, capped and placed in a 50° C. water bath for 60 hours during which time a copolymer of 1,2 butylene sulfide, ethylene sulfide, and allylthioglycidyl ether formed. The bottle was cooled, opened, and the contents poured into 2,000 ml. of methanol causing the polymer to precipitate. This precipitated polymer product was washed twice with separate 1,000 ml. portions of methanol and dried in a vacuum oven at 50° C. to constant weight. The yield obtained was 98.7 grams or 98.0 percent of the product yield theoretically possible.

A quantity of 100 grams of this copolymer was compounded on a rubber roll mill with 1.0 gram of stearic acid, 50.0 grams of a high abrasion furnace black sold under the trade name Philblack "O", 0.6 gram of sulfur, 2.0 grams of selenium diethyldithiocarbamate, and 1.0 grams of octyl decylamine.

The physical properties of the above composition after being cured for 20 minutes at 300° F. were as follows:

| Modulus | |
|---|---|
| 100% | 135 |
| 200% | 305 |
| 300% | 500 |
| Tensile | 745 |
| Elongation | 490 |
| Hardness, Shore A | 54 |
| Tear Strength | 120 |
| Compression Set | 100 |
| Compression Set Tempered | 87 |

Samples of the cured interpolymer were placed in a series of solvents. After one week at room temperature the samples were swollen as follows:

| Toluene | 334% |
|---|---|
| Methyl ethyl ketone | 157% |
| Chloroform | 572% |
| Ethyl acetate | 121% |
| Hexane | 17% |

EXAMPLE 13

A clean, dry 30-ounce polymerization bottle was charged with 400 ml. of benzene, 75.8 grams of propylene sulfide, 22 grams of allylthioglycidyl ether, 9 grams of cyclohexane sulfide and 0.2 gram of Cd(OH)$_2$. The bottle was capped and placed in a water bath at 62° C. ±4° C. for 41 hours during which time a terpolymer of propylene sulfide, cyclohexene sulfide and allylthioglycidyl ether formed. Next the contents of the bottle were transferred into methanol where the terpolymer precipitated out. The terpolymer was subsequently soaked in petroleum ether, then was dried under vacuum at 50° C. The product yield was 85.9 percent of that theoretically possible.

A quantity of 100 grams of the polymer was mixed on a rubber milling roll with 1 gram of stearic acid, 50 grams of a carbon black sold under the trade name Philblack "O", 5 grams of zinc oxide, 2 grams of selenium diethyldithiocarbamate, and 0.9 gram of sulfur.

This completion was cured in 20 minutes at 300° F. and had the following physical properties:

| Modulus | |
|---|---|
| 100% | 605 |
| 200% | 1,305 |
| Tensile | 1,420 |
| Elongation | 220 |
| Hardness | 7 |

EXAMPLE 14

A 30-ounce reaction bottle was sparged with nitrogen and charged with 400 ml. of dry benzene, 70.0 grams of butylene sulfide, 22 grams of allylthioglycidyl ether, 8 grams of cyclohexene sulfide and 10 ml. of diethyl zinc solution prepared as described in example 3. The bottle was again sparged with nitrogen, sealed, and heated at 65° C. for 17 hours during which time a terpolymer of cyclohexene sulfide, butylene sulfide, and allylthioglycidyl ether formed. The bottle was then cooled, opened and the contents were poured into 200 ml. of methanol where the terpolymer precipitated. Next, the terpolymer was washed twice with separate 1,000 ml. portions of methanol and once with 500 ml. of petroleum ether. The resulting material was dried at 50° C. under vacuum and yielded 83.8 grams of a semisolid terpolymer.

A small quantity of the terpolymer was heated at 180° C. for 4 hours in the presence of 1.5 percent by weight of azobisisobutyronitrile during which time it cured to a hard rubbery compound resistant to solution in chloroform.

EXAMPLE 15

Two mixtures each containing 29.3 grams of styrene sulfide, 14.8 grams of thioglycidyl acrylate, 34.8 grams of 1,2 butylene sulfide, 320 ml. of benzene and 0.158 gram of cadimum hydroxide were placed in separate reactors and agitated for 4 days at 50° C. in which time a terpolymer of styrene sulfide, butylene sulfide and thioglycidyl acrylate formed. One reactor, designated Reactor A, was then opened, the contents poured into 2 liters of methanol, and the terpolymer product thereby separated from the rest of the mixture. A viscous oily terpolymer product was obtained.

Reactor B was also opened at this time and 7 to 10 ml. of its contents were added to 2 liters of methanol causing a small amount of a viscous oily terpolymer to be precipitated. Reactor B was resealed and placed in a water bath set at 80° C. for an additional 21 hours. Then Reactor B was cooled to room temperature, and its polymeric contents were precipitated in 2,000 ml. of methanol and washed with petroleum ether.

The terpolymer products of Reactors A and B were each dissolved in 100 ml. of benzene and the two solutions were combined. The combined solution was treated with 1800 ml. of petroleum ether causing the polymeric products to precipitate. After the ether was decanted off, the combined solution was treated again with petroleum ether to remove any remaining polymer. The resultant terpolymer mixture was then purified by redissolving it in benzene and recovered by removing the benzene under 10–15 mm. of Hg. of 35°–40° C. for 3 hours. The combined yield of terpolymer products from Reactors A and B was 68 grams.

At this point, two 5-gram samples of the terpolymer mixture were placed in two separate aluminum dishes. To one of the dishes 0.2 gram of azobisisobutyronitrile was added. Each sample was placed in an oven set at 90° C. for about 16 hours. During this period the sample which contained the azobisisobutyronitrile cured to a solid elastomer whereas the sample which had not been mixed with the azobisisobutyronitrile remained a viscous oily material.

A further extraction test was run to demonstrate the cure of the polymer formed in the presence of azobisisobutyronitrile. Into two extraction thimbles were weighed 1.998 grams of the uncured terpolymer and 1.761 grams of the polymer cured with the azobisisobutyronitrile. The contents of each thimble were extracted for 28 hours with 250 ml. of benzene. The residual materials from each thimble were air dried for 4 days, then vacuum dried at 50° C. for about 20 hours and reweighed. The residue of the polymer formed with azobisisobutyronitrile was 1.093 grams or 62.2 percent of the original sample weight, indicating a substantially cured polymer.

EXAMPLE 16

A 30-ounce polymerization bottle was charged with 40.7 grams of styrene sulfide, 40.6 grams of propylene sulfide, 19.5 grams of allylthioglycidyl ether, 400 ml. of benzene and 10 ml. of diethyl zinc catalyst solution as prepared in example 3. The bottle was sparged with nitrogen, capped and placed in a rotating 50° C. bath for 42 hours during which time a copolymer of propylene sulfide, styrene sulfide and allylthioglycidyl ether were formed. The contents of the bottle were then cooled and poured into methanol causing the copolymer to precipitate. The copolymer particle size was mechanically reduced and the copolymer was washed again with separate portions of methanol. The copolymer yield was 68.1 grams, 67.5 percent of that theoretically possible.

The above experiment was repeated and a 71.5 percent product yield was realized.

A small quantity of the copolymer product was heated at 180° C. for 4 hours in the presence of 1.5 percent by weight of azobisisobutyronitrile during which time it cured to a hard material resistant to solvent attack by chloroform.

EXAMPLE 17

A mixture containing 51 grams of propylene sulfide, 22.5 grams of ethylene sulfide, 27 grams of thioglycidyl acrylate, 0.2 gram of cadmium hydroxide and 400 ml. of benzene was placed in a polymerization reactor, agitated at 50° C. for 17 ¼ hours, and then at 65° C. for another 17¼ hours during which time a copolymer of propylene sulfide, ethylene sulfide, and thioglycidyl acrylate was formed. The contents were then cooled and precipitated in methanol. The copolymer was left in the methanol for 3 days before being washed and dried under vacuum at 50° C.

The product, a solid, elastomeric, terpolymer, of propylene sulfide, ethylene sulfide, and thioglycidyl acrylate weighed 76.6 grams. The weight corresponded to 73 percent of the theoretically possible yield.

EXAMPLE 18

A clean, dry 30-ounce reaction bottle was charged with 175 ml. of reagent grade benzene, 31.6 grams of thioglycidyl methacrylate, 12 grams of ethylene sulfide, and 0.2 gram of cadmium hydroxide. The bottle was capped and placed in a rotating bath for 16 hours at 80° C. during which time a solid copolymer of thioglycidyl methacrylate and ethylene sulfide was formed. At the end of this interval the bottle was removed and uncapped. The solid product was filtered off, washed with methanol, and dried under vacuum at 50° C. The filtrate was evaporated under vacuum at 60° C. and washed with petroleum ether to remove residual traces of the polymeric product. The polymer was a solid elastomer and had a melting point of 230°–250° C. and a yield of 27.6 percent. The yield of this polymer was 65 percent of that theoretically possible.

EXAMPLE 19

A 30-ounce polymerization bottle was charged with 90 ml. of benzene, 10 grams of styrene sulfide, 8 grams of allylthioglycidyl ether and 0.2 gram of cadmium hydroxide. The bottle was sealed and placed in a 80° C. bath for 17 hours during which time a copolymer of styrene sulfide and allylthioglycidyl ether formed. After cooling, the contents were poured into 800 ml. of petroleum ether causing the precipitation of an oily copolymer. The petroleum ether was decanted off and the copolymer product was washed with 500 ml. of petroleum ether. The product yield was 21.6 percent of that theoretically possible.

EXAMPLE 20

A clean, dry 30-ounce polymerization bottle was charged with 90 ml. of benzene, 10 grams of styrene sulfide, 10 grams of thioglycidyl methacrylate, and 0.2 gram of cadmium hydroxide. The bottle was then sealed and reacted for 16 hours in a 65° C. water bath during which time a copolymer of thioglycidyl acrylate and styrene sulfide formed in the reactor. Upon cooling, the contents were transferred into 800 ml. of petroleum ether precipitating the polymer. The size of the polymer product was reduced mechanically; the polymer was then washed twice with separate 500 ml. portions of methanol and dried to a constant weight under vacuum. The yield was 52.5 percent of that theoretically possible.

The copolymer was dissolved in chloroform and 0.25 gram of benzoyl peroxide was added to the solution. The chloroform was then evaporated and the residual polymer sample was placed in an oven to cure at 120° C. for 19 hours. Upon extraction with chloroform, the cured polymer retained 47.3 percent of its weight, indicating that the heating in the presence of the benzoyl peroxide caused a cure of the copolymer.

It is of course to be understood that the foregoing examples are intended to be illustrative and that numerous changes can be made in the ingredients, proportions, and conditions set forth therein without departing from the spirit of the invention as defined in the appended claims.

Thus, minor amounts of various other monomers can be copolymerized with the aforementioned monomers. Some such monomers are cyclic sulfides having the structure:

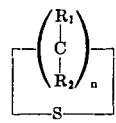

wherein $n=3$ to 6, and $R_1$ and $R_2$ may be heterocyclic, alicyclic, bicyclic, polycyclic, and may be H, lower, branched or linear alkyl groups having from one to 10 carbon atoms, aryl, arylalkyl, and/or alkylaryl groups. Some examples of such compounds are trimethylene sulfide, pentamethylene sulfide and hexamethylene sulfide.

Among compounds containing ethylenic unsaturation i.e.,

are ethylene, propylene, butylene and isobutylene, conjugated and nonconjugated dienes such as butadiene, isoprene and 1,4-pentadiene; and vinyls such as styrene, vinyl acetate, ethyl acrylate, methyl acrylate, methyl methacrylate, butyl acrylate, acrylonitrile, vinyl isobutyl ether, methyl styrene, hydroxy propyl methacrylate, tetrafluoroethylene, chlorotrifluoroethylene and hexafluoropropylene.

Compounds may also be used having the structure:

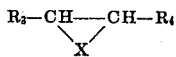

in which X is O or N and $R_3$ and $R_4$ may be H, a lower branched or linear alkyl group having from one to 10 carbon atoms, an aryl, an arylalkyl and/or an alkylaryl group. $R_3$ and $R_4$ may also be heterocyclic, alicyclic, bicyclic, or polycyclic, for example, styrene oxide, ethylene imine and propylene imine; and other polymerizable compounds like formaldehyde, trioxane, hydroxyisobutyric acid, tetrahydrofuran, 1,3-dioxolane 1,4-dioxane, trimethylene oxide, tetramethylene oxide and pentamethylene oxide.

We claim:

1. A curable elastomeric copolymer essentially composed of a major portion of monomeric units derived from one or more monomers which are free from ethylenic unsaturation and selected from 1,2-butylene sulfide, 2,3-butylene sulfide, vinyl cyclohexane sulfide, 2-benzyl thiirane, p-methyl styrene sulfide, styrene sulfide, cyclohexane episulfide and isobutylene sulfide, and a minor portion of monomeric units derived from one or more monomers having both a polymerizable thiiranyl group and a polymerizable ethylenically unsaturated. group, said monomers being polymerized through the thiiranyl groups thereof.

2. A copolymer as in claim 1 comprising a major portion of monomeric units derived from butylene sulfide.

3. A copolymer as in claim 1 wherein said monomers having a polymerizable ethylenically unsaturated group are selected from the group consisting of allylthioglycidyl ether, vinyl cyclohexene episulfide and butadiene monoepisulfide.

4. A cured polymer formed by curing the copolymer of claim 1 through the ethylenically unsaturated. groups thereof.

5. A polymer according to claim 1 containing a minor proportion of monomeric units derived from ethylene sulfide.

6. A vulcanizable elastomeric copolymer consisting essentially of units derived from a major portion of butylene sulfide and a minor portion of allylthioglycidyl ether, said ether being polymerized through the thioglycidyl group thereof.

7. A copolymer consisting essentially of a major portion of propylene sulfide units, a minor portion of ethylene sulfide units, and a minor portion of allylthioglycidyl ether units, said ether being polymerized essentially wholly through the thioglycidyl group thereof, said copolymer having pendant ethylenically unsaturated groups through which it can be cured.

8. A cured copolymer formed by curing the polymer of claim 7 essentially wholly through the ethylenically unsaturated groups thereof.

9. A copolymer consisting essentially of a major portion of butylene sulfide units, a minor portion of ethylene sulfide units, and a minor portion of allylthioglycidyl ether units, said ether being polymerized essentially wholly through the thioglycidyl group thereof, said copolymer having pendant ethylenically unsaturated groups through which it can be cured.

10. A cured polymer formed by curing the polymer of claim 9 essentially wholly through the ethylenically unsaturated groups thereof.

11. A copolymer consisting essentially of a major portion of butylene sulfide units, a minor portion of cyclohexane sulfide units, and a minor portion of allythioglycidyl ether units, said ether being polymerized essentially wholly through the thioglycidyl group thereof, said copolymer having pendant ethylenically unsaturated groups through which it can be cured.

12. A cured copolymer formed by curing the polymers of claim 11 essentially wholly through the ethylenically unsaturated groups thereof.

13. A vulcanized copolymer of butylene sulfide and allylthioglycidyl ether.

* * * * *